United States Patent
Olafsen et al.

(10) Patent No.: US 8,352,810 B2
(45) Date of Patent: Jan. 8, 2013

(54) FAULT DETECTION USING EMBEDDED WATERMARKS

(75) Inventors: Are Olafsen, Newcastle Upon Tyne (GB); Jeffrey Adam Bloom, West Windsor, NJ (US); Kumar Ramaswamy, Princeeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 642 days.

(21) Appl. No.: 12/451,410

(22) PCT Filed: May 6, 2008

(86) PCT No.: PCT/US2008/005798
§ 371 (c)(1),
(2), (4) Date: Nov. 10, 2009

(87) PCT Pub. No.: WO2008/140704
PCT Pub. Date: Nov. 20, 2008

(65) Prior Publication Data
US 2010/0138730 A1  Jun. 3, 2010

Related U.S. Application Data

(60) Provisional application No. 60/928,566, filed on May 10, 2007.

(51) Int. Cl.
*G01R 31/28*  (2006.01)
*G06F 11/00*  (2006.01)
*G06F 7/02*   (2006.01)

(52) U.S. Cl. .......................... 714/704; 714/715; 714/819

(58) Field of Classification Search .................. 714/704, 714/715, 819; 713/176; 386/260
See application file for complete search history.

(56) References Cited

U.S. PATENT DOCUMENTS

| 7,992,074 B2 * | 8/2011 | Katou et al. .................. 714/776 |
| 2002/0157005 A1 | 10/2002 | Brunk et al. |
| 2002/0191810 A1 | 12/2002 | Fudge et al. |
| 2003/0039464 A1 | 2/2003 | Davis et al. |
| 2003/0115504 A1 * | 6/2003 | Holliman et al. ............... 714/25 |
| 2004/0103397 A1 | 5/2004 | Agarwala et al. |
| 2006/0018507 A1 * | 1/2006 | Rodriguez et al. ............ 382/100 |
| 2006/0083403 A1 * | 4/2006 | Zhang et al. .................. 382/100 |
| 2006/0282676 A1 * | 12/2006 | Serret-Avila et al. ......... 713/176 |
| 2007/0040934 A1 * | 2/2007 | Ramaswamy et al. ..... 348/385.1 |
| 2010/0287579 A1 | 11/2010 | Petrovic et al. |

FOREIGN PATENT DOCUMENTS

JP  2006-504986  2/2006

(Continued)

OTHER PUBLICATIONS

Bartolini, F.; Manetti, A.; Piva, A.; Barni, M.; , "A data hiding approach for correcting errors in H.263 video transmitted over a noisy channel," Multimedia Signal Processing, 2001 IEEE Fourth Workshop on , vol., No., pp. 65-70, 2001.*

(Continued)

*Primary Examiner* — Cynthia Britt
(74) *Attorney, Agent, or Firm* — Robert D. Shedd; Robert B. Levy

(57) ABSTRACT

Detection of faults in a transmitted signal stream occurs by recovering, from the information stream, a water mark embedded in the stream prior to transmission. The embedded watermark has data characteristic of stream quality. Thereafter, the at least one watermark property is analyzed to detect faults in the received information stream.

4 Claims, 4 Drawing Sheets

FOREIGN PATENT DOCUMENTS

| WO | WO03062960 | 7/2003 |
|---|---|---|
| WO | WO 2004/036352 | 4/2004 |
| WO | WO2007072326 | 6/2007 |
| WO | WO2007072327 | 6/2007 |

OTHER PUBLICATIONS

Xiaoming Chen; Yuk Ying Chung; Changseok Bae; , "A Novel Error Detection and Copyright Protection Scheme for MPEG2 Video," TENCON 2005 2005 IEEE Region 10 , vol., No., pp. 1-6, Nov. 21-24, 2005.*

Heymann, R.; Ferreira, H.C.; , "Regaining synchronization using neural networks to detect watermark codes," Information Theory and Its Applications, 2008. ISITA 2008. International Symposium on , vol., No., pp. 1-6, Dec. 7-10, 2008.*

Chuang Lin; Jeng-Shyang Pan; Bin-Yih Liao; , "Robust VQ-Based Digital Image Watermarking for Mobile Wireless Channel," Systems, Man and Cybernetics, 2006. SMC '06. IEEE International Conference on , vol. 3, No., pp. 2380-2384, Oct. 8-11, 2006.*

Campisi, et al.:"Blind Quality Assessment System for Multimedia Communications Using Tracing Watermarking", IEEE Transactions on Signal Processing, vol. 51, No. 4, Apr. 2003, pp. 996-1002, XP001171825.

European Search Report dated Aug. 28, 2008.

* cited by examiner

FAULT DETECTION USING EMBEDDED WATERMARKS

CROSS-REFERENCE TO RELATED APPLICATIONS

This application claims the benefit, under 35 U.S.C. §365 of International Application PCT/US2008/05798 and filed May 6, 2008, which was published in accordance with PCT Article 21(2) on Nov. 20, 2008, in English and which claims the benefit of U.S. Provisional Patent Application No. 60/928,566, filed on May 10, 2007, in English.

TECHNICAL FIELD

This invention relates to a technique for detecting a fault in connection with the transmission of information.

BACKGROUND ART

Typically, the distribution of digital video content occurs by first compressing the content at a head end for transmission, often via satellite, to a downstream station at which the content typically undergoes transcoding prior to further distribution. In the course of the transmission of content between the head end and a downstream station, one or more faults can occur which currently can only be detected via human monitoring of the transcoded content stream. Present day monitoring techniques involve manual inspection of a changed channel and the reporting of errors if any resulting from such manual inspection. Tools presently exist for monitoring link quality. However, link quality only provides an indirect indicator of problems associated with a satellite/channel switch but does not serve as a reliable indicator of other problems that can exist in the transport and upper signal layers that could potentially prevent receipt of the correct video signal.

BRIEF SUMMARY OF THE INVENTION

Briefly, in accordance with a first illustrative embodiment of the present principles, there is provided a method for detecting faults occurring in a transmitted signal stream. The method commences by recovering, from the information stream, a water mark embedded in the stream prior to transmission. The embedded watermark has data characteristic of stream quality. Thereafter, the at least one watermark property is analyzed to detect faults in the received information stream. For example, among its properties, the watermark could include a program identifier (e.g., a Program ID). By comparing the Program ID in the recovered watermark to an expected Program ID, a determination can be made whether the correct program is being received. Another possible watermark property would be a count that increases sequentially with each received frame or group of frames. Thus, a failure of the count to increase would indicate a decoding failure. Further, the signal strength of the watermark itself also can constitute a property indicative of the quality of the received signal stream. If the signal strength does not exceed a minimum value, then the received signal stream is likely corrupted.

In accordance with a second preferred embodiment of the present principles, there is provided a method for communicating an information stream to a downstream receiver. The method comprises the step of embedding in the information stream prior to transmission a watermark having data characteristic of stream quality. Recovering the watermark and analyzing the embedded watermark provides a mechanism for detecting faults in the information stream following reception.

DETAILED DESCRIPTION

Figure 1:
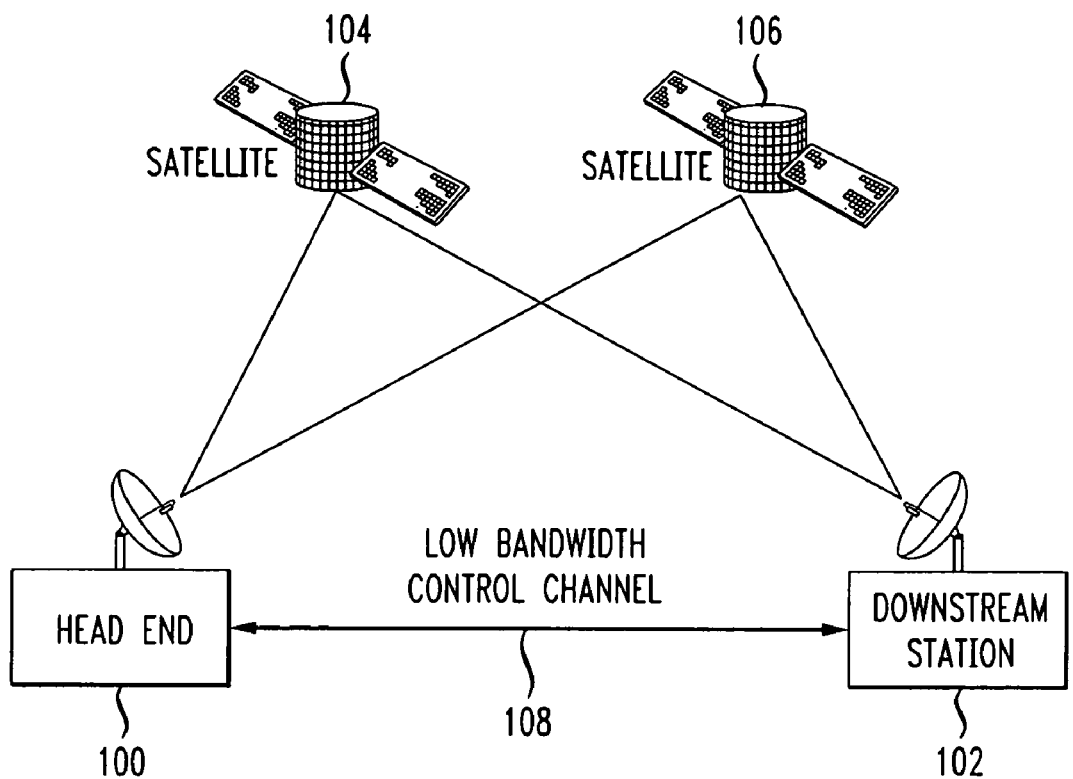
FIG. 1 depicts a block schematic diagram of an information communication system.

FIG. 1 illustrates an exemplary information communication system for practicing the fault detection technique of the present principles. As depicted in FIG. 1, a head end 100, typically under the control of a content owner or its agent, transmits an information stream, typically in form of a stream of digitized content (video and/or audio and/or data), to a downstream station 102. The downstream station 102 can take the form of an affiliated regional head that transcodes the content stream for subsequent distribution. Transmission of the content stream from the head end 100 to the downstream station 102 can occur via a satellite 104. While the remainder of this application uses satellite transmission to describe the concept, the principles described herein extends to any transmission network that broadcasts/multicasts information.

Occasionally, a need exists to switch transmission of the content stream from the satellite 104 to another satellite 106 or from one transponder to a different transponder on the same satellite. In order to remain synchronized, the head end 100 will transmit certain information to the downstream station 102 some time prior to the switch. This information typically includes the exact time that the switch will occur, the identity of the new satellite and the particular channel on which the new satellite will transmit the stream. At an appointed time, both the head-end 100 and the downstream station 102 will simultaneously switch from the current channel on the satellite 104 to the specified channel on the satellite 106.

A successful switch by the head-end 100 to the new channel on the new satellite 106 does not automatically assure that the downstream station 102 will successfully make the switch as well. Presently, a human operator must manually monitor the output of the downstream station 102 to verify decoding of the correct stream. Upon detecting a fault, the operator at the downstream 102 station typically will send a message to the head-end 100 via a low-bandwidth channel 108 requesting retransmission of the information on the new channel or a different channel if available. The low bandwidth channel 108 can take the form of an ordinary Plain Old Telephone Service (POTS) line for carrying voice messages, or a data channel for carrying digital voice or text messages.

Figure 2:
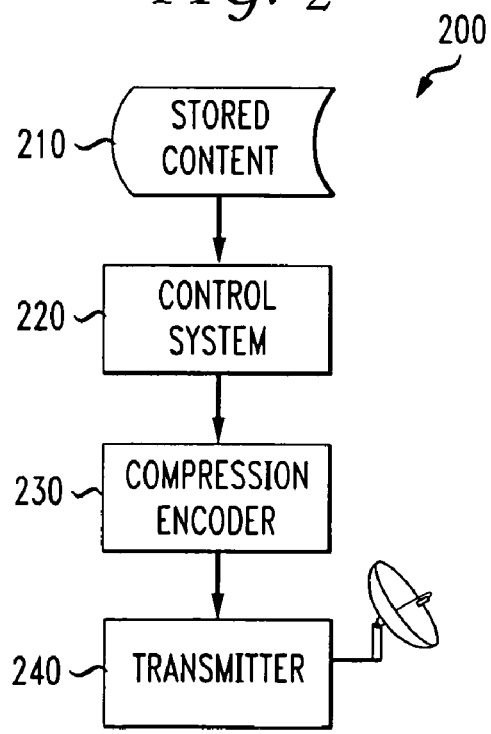
FIG. 2 depicts a block schematic diagram of a transmission system according to the prior art that comprises part of the communication system of FIG. 1.

FIG. 2 depicts a block schematic diagram of a prior-art transmission 200 system associated with the head end 100 of FIG. 1. The transmission system 200 includes a database 210 of stored content (e.g., programs). A control system 220 makes use of scheduling information to select one or more programs in the database 210 for transmission, and to select the satellite and the satellite channel that will transmit the selected program(s). The selected programs then undergo compression encoding by an encoder 230 which compresses the programs at a specified bitrate using a selected specified compression standard (e.g., MPEG-2). Finally, the compressed programs undergo transmission by transmitter 240, which typically takes the form of an uplink station for transmitting the programs to a specified satellite, such satellite 104 or 106 of FIG. 1.

In accordance with a one aspect of the present principles, automated detection of faults can occur by using digital watermarking technology to embed in the transmitted content stream, e.g., the compressed program(s), a watermark containing certain information. Such information can include a Program ID. In practice, the Program ID undergoes a separate transmission from the content owner head-end 100 of FIG. 1 to the downstream station 102 of FIG. 1 either via satellite (the in-band channel) or out-of-band via the low bandwidth channel 108 of FIG. 1. Thus, the downstream station 102 of FIG. 1 will know the Program ID apart from the Program ID embedded in the transmitted program. The downstream station 102 will recover the Program ID from the received program for comparison against the separately sent Program ID. If the separately transmitted Program ID and the Program ID recovered from the transmitted program do not match, then the program switch was not successful.

Digital watermarking comprises a collection of techniques for modifying the original content to embed to watermark data such that the modified content is perceptually similar to the original content and the watermark data can be subsequently recovered from the content as modified even if the content has been distorted. Watermarking systems include both an embedder for modifying the original content and one or more detectors for recovering the watermark data. Some embedders operate on baseband images while some operate on compressed content streams. Similarly, some detectors operate on baseband images and others operate on compressed streams. Some systems are designed such that the watermark data can be embedded in the compressed stream, but detected in baseband. Similarly, some systems allow the watermark embedding in the baseband and detection in a compressed stream. In accordance with the present principles, the watermarking of content occurs by watermarking the video portion of such content. Alternatively, the audio portion of the content could undergo watermarking in place of the video portion of the content.

Figure 3:
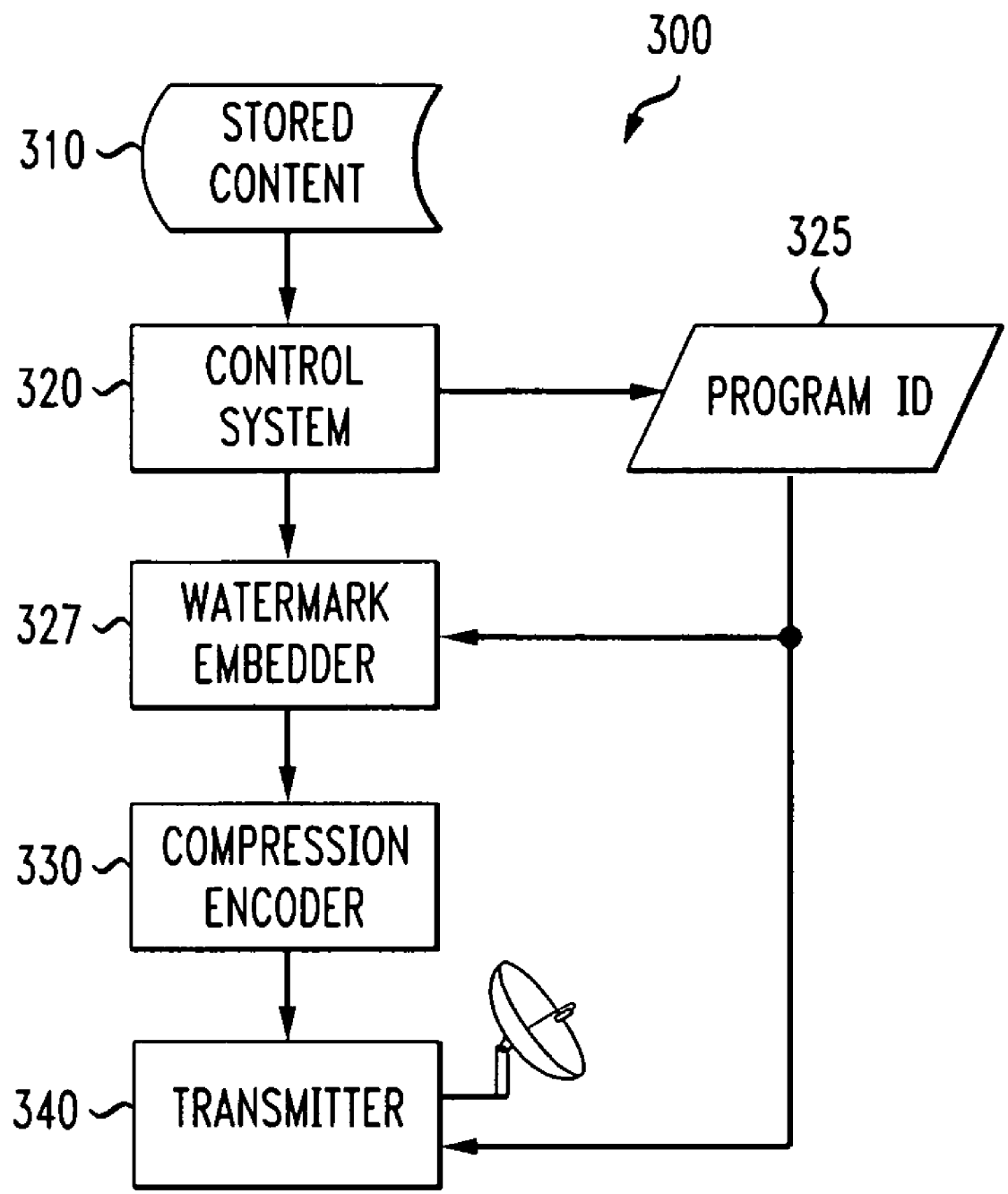
FIG. 3 depicts a block schematic diagram of a first preferred embodiment of a transmission system for use with the communication system of FIG. 1 for embedding a watermark in the transmitted signal stream to enable fault detection in accordance with the present principles.

FIG. 3 depicts a block schematic diagram of a transmission system 300 in accordance with a first embodiment of the present principles for incorporation within the head end 100 of FIG. 1 for embedding a watermark in the content for fault detection purposes. The transmission system 300 of FIG. 3 includes a database 310 of stored content (e.g., programs). A control system 320 makes use of scheduling information to select one of more programs in the database 310 for transmission, and to select the satellite and the satellite channel that will transmit the selected program(s). In addition to selecting the program(s) for ultimate transmission, the control system 320 also generates a program identifier, generally referred to by the term "Program ID," that particularly identified each selected program. As depicted in FIG. 3, the Program ID undergoes storage in a memory or buffer 325. Although the memory 325 that stores the Program ID appears as a separate element from the control system 320, the memory could reside within the control system itself.

The program(s) selected by the control system 320 undergo processing by a watermark embedder 327 which embeds into each selected program a digital watermark containing the corresponding Program ID for that program. The watermark embedder 327 of FIG. 3 inserts data (e.g., the Program ID) into the baseband video portion of the selected program, either in every frame or into a subset of frames. Preferably, the embedded data appears with some minimum frequency. After each program has its corresponding Program ID embedded therein, the program then undergoes compression encoding by an encoder 330 which compresses the program at a specified bitrate using a selected specified compression standard. Finally, the compressed program undergoes transmission by transmitter 340, which typically takes the form of an uplink station for transmitting the programs to a specified satellite, such satellite 104 or 106 of FIG. 1. The transmitter 340 also receives the Program ID directly from the memory 325 for transmission to the downstream stations 102 of FIG. 1, either by multiplexing onto the transmitted content stream and/or by transmission via the low-bandwidth channel 108 of FIG. 1. This delivery of the Program ID occurs repeatedly on a periodic basis.

Figure 4:
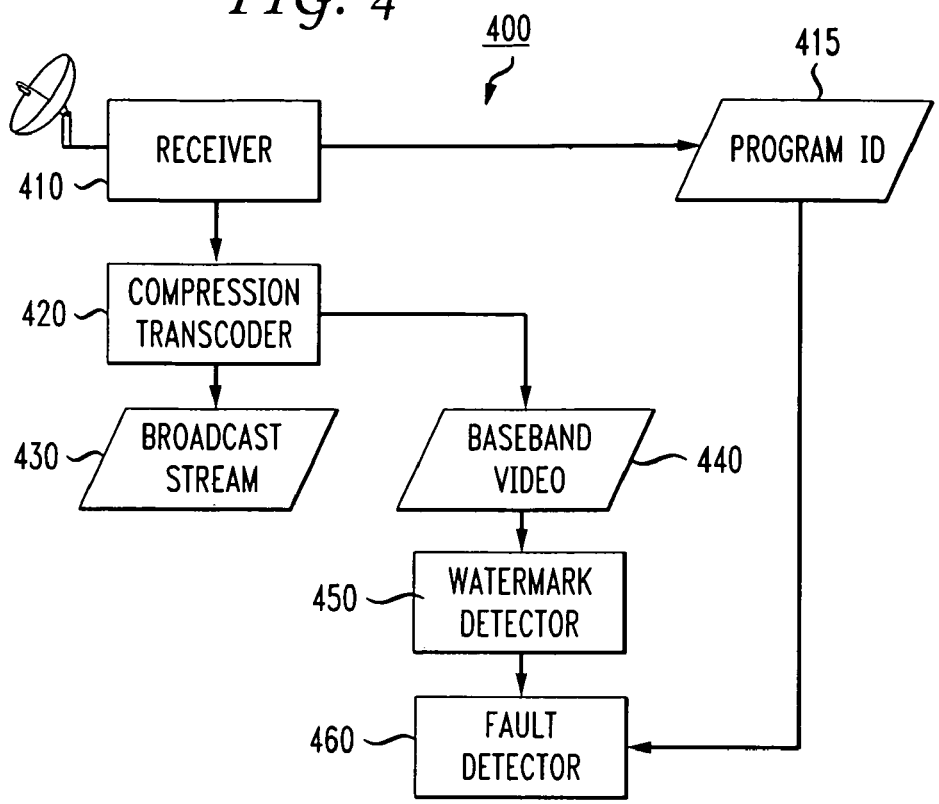
FIG. 4 depicts a block schematic diagram of a first preferred embodiment of receiver for use with the communications system of FIG. 1 for detecting faults in the received signal stream by analyzing the embedded watermark in accordance with the present principles.

FIG. 4 depicts a block schematic diagram of a receiver system 400 in accordance with a first embodiment of the present principles for detecting faults based on recovered watermark data. In practice, the receiver system 410 of FIG. 4 resides in the downstream station 102 of FIG. 1. The receiver system 400 of FIG. 4 includes a receiver 410 tuned to a particular channel on a specified satellite, such as one of satellites 104 and 106 of FIG. 1. The receiver 410 possesses the capability of tuning a different channel on the same or a different satellite. The receiver 410 serves to recover both the transmitted content (including the embedded Program ID) as well as the separately provided Program ID multiplexed in the content stream or received via the low bandwidth channel. The separately provided Program ID undergoes storage in a memory 415 which can be integral with or separate from the receiver 410. The content stream recovered by the receiver 410 undergoes compression transcoding via a compression transcoder 420 into a format for distribution to regional subscribers by at least one hub 430. The compression transcoder 420 also decodes the content stream to obtain baseband video stored in a memory or buffer 440 for subsequent receipt by a watermark detector 450. The watermark detector 450 recovers embedded data, including the Program ID, in the baseband video, and passes this data, along with a value indicating the strength of the detection, to a fault detector 460. Since the embedded watermark data appears periodically in the baseband video, the watermark detector 450 will periodically recover such data for receipt by the fault detector 460.

The fault detector 460 compares the Program ID held in the memory 415 to the Program ID recovered by the by the watermark detector 450. If the two values do not match, then the fault detector 460 issues an alert indicating that the received content stream does not match the expected content stream. If the watermark strength, as reported by the watermark detector 450, does not exceed a set threshold, then the fault detector 460 will also an alert indicating potential corruption of the received content stream.

The data embedded by in the video portion of the content stream by the watermark embedder 327 of FIG. 3 can include a sequential count. In practice, each time the watermark detector 450 of FIG. 4 passes recovered data to the fault detector 460, the value of the count should increase as compared to the count detected on the previous recovery. Upon reaching a maximum value, the count resets to an initial value. If the fault detector 460 detects a count value that does not change, the fault detector issues an alert, indicating that the compression transcoder 420 has become "stuck" and currently outputs still frame.

Figure 5:
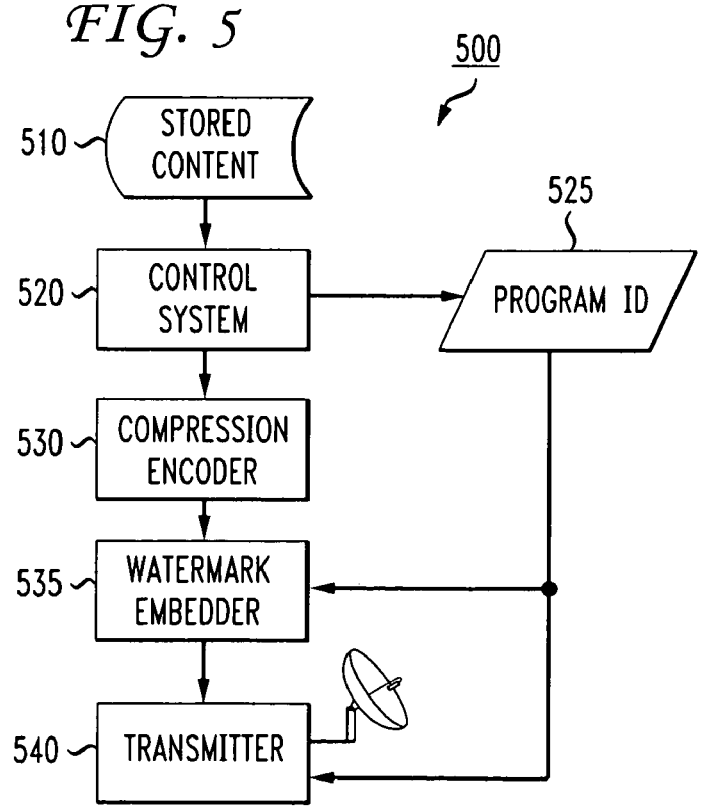
FIG. 5 depicts a block schematic diagram of a second preferred embodiment of a transmission system for use with the communications system of FIG. 1 for embedding a watermark in the transmitted signal stream to enable fault detection in accordance with the present principles.

FIG. 5 depicts a block schematic diagram of a transmitter system 500 in accordance with a second embodiment of the present principles for incorporation within the head end 100 of FIG. 1 for embedding a watermark in the content for fault detection purposes. The transmission system 500 of FIG. 3 includes a database 510, a control system 520, a Program ID memory 525, a compression encoder 530, a watermark embedder 535, and a transmitter 540 which each perform substantially the same function as the database 310, control system 320, compression encoder 330, watermark detector 330 and transmitter 340, respectively, of the transmitter system 300 of FIG. 3. As compared to the transmitter system 300 of FIG. 3 whose watermark embedder 327 inserts data (e.g., the Program ID and the sequential count) into the baseband video portion of the content, the watermark embedder 535 of the transmission system 500 inserts such data into the compressed video portion of the content. Otherwise, the transmitter system 500 of FIG. 5 operates in the same manner as described with respect to the transmitter system 300 of FIG. 3.

Figure 6:
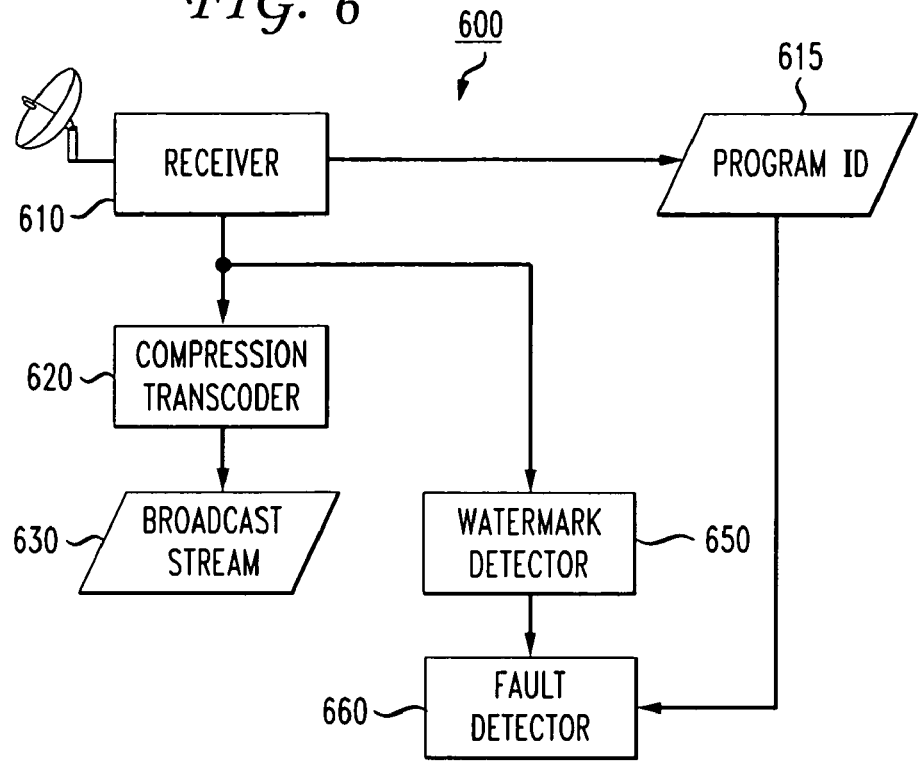
FIG. 6 depicts a block schematic diagram of a second preferred embodiment a receiver for use with the communications system of FIG. 1 for detecting faults in the received signal stream by analyzing the embedded watermark in accordance with the present principles.

FIG. 6 depicts a block schematic diagram of a receiver system 600 in accordance with a second embodiment of the present principles for detecting faults based on recovered watermark data. The receiver system 600 of FIG. 6 includes a receiver 610, a Program ID memory 615, a compression transcoder 620, a hub 630, a watermark detector 650, and a fault detector 660, each performing substantially the same function as the receiver 410, the Program ID memory 415, the compression transcoder 420, the hub 430, the watermark detector 450 and the fault detector 460, respectively. As compared to the receiver system 400 of FIG. 4 in which the watermark detector 450 operates on baseband video, the watermark detector 650 of the receiver system 600 operates on the content stream prior to compression transcoding. While the input stream to the watermark detector 650 exists in a different format as compared to the input stream to the watermark detector 450 of FIG. 4, the output is the same.

Figure 7:
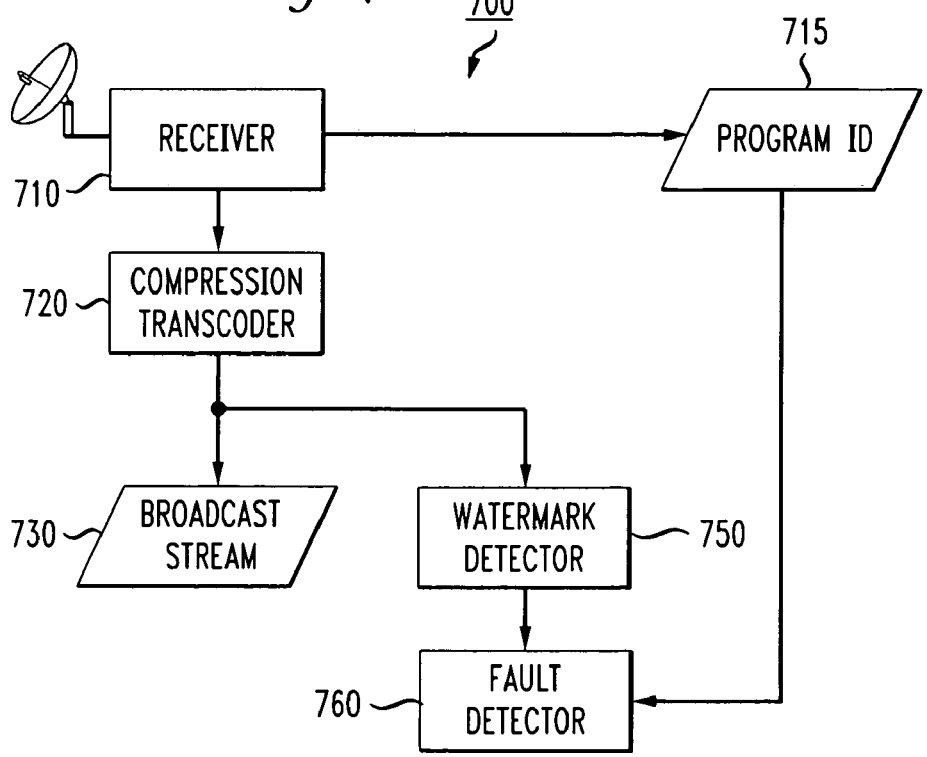
FIG. 7 depicts a block schematic diagram of a third preferred embodiment of a receiver for use with the communications system of FIG. 1 for detecting faults in the received signal stream by analyzing the embedded watermark in accordance with the present principles.

FIG. 7 depicts a block schematic diagram of a receiver system 700 in accordance with a third embodiment of the present principles for detecting faults based on recovered watermark data. The receiver system 700 of FIG. 6 includes a receiver 710, a Program ID memory 715, a compression transcoder 720, a hub 730, a watermark detector 750, and a fault detector 760, each performing substantially the same function as the receiver 410, the Program ID memory 415, the compression transcoder 420, the hub 430, the watermark detector 450 and the fault detector 460, respectively. As compared to the receiver system 400 of FIG. 4 in which the watermark detector 450 operates on baseband video, the watermark detector 750 of the receiver system 700 operates on the compressed transcoded content stream produced by the compression transcoder 720. While the input stream to the watermark detector 750 exists in a different format as compared to the input stream to the watermark detector 450 of FIG. 4, the output of the watermark detector 750 is the same.

The foregoing describes a technique for detecting faults in an information communications system by examining watermarked data embedded in transmitted content. It must also be recognized that the watermark embedding technique for failsafe program or context switching can be generalized to switching between multicast groups in an IP network. In other words, the technique of the present principles is not confined to a particular mode of transmission, but rather, but has applicability for detecting faults during content reception when transitioning among content sources.

The invention claimed is:

1. A method comprising the steps of:
   recovering, from a received information stream, a watermark embedded in the stream, the watermark having data that is characteristic of stream quality; the watermark data including a program identifier that identifies a program within the information stream and wherein the watermark data includes a successively increasing count which identifies a video frame in which the watermark data is embedded; and
   analyzing the watermark to establish the quality of the received information stream by (a) comparing the program identifier to a reference program identifier and (b) comparing the successively increasing count of successively recovered watermarks to a previous watermark count to determine whether the count has increased.

2. The method according to claim 1 wherein the watermark is recovered from a baseband portion of received information stream following compression transcoding of the stream.

3. The method according to claim 1 wherein the watermark is recovered from the received information stream prior to compression transcoding of the stream.

4. Apparatus comprising:
   a receiver for receiving an information stream having a watermark embedded in the stream, the watermark having data that is characteristic of stream quality the watermark data including a program identifier that identifies a program within the information stream and wherein the watermark data includes a successively increasing count which identifies a video frame in which the watermark data is embedded;
   a watermark detector for extracting the data from the watermark; and
   a fault detector for analyzing the extracted data to detect whether a fault exists in the received information stream by comparing (a) the program identifier to a reference program identifier and (b) comparing the successively increasing count of successively recovered watermarks to a previous watermark count to determine whether the count has increased.

* * * * *